US010391872B2

(12) United States Patent
Gaither et al.

(10) Patent No.: US 10,391,872 B2
(45) Date of Patent: Aug. 27, 2019

(54) ELECTROMAGNETIC CHARGE SHARING AND LOW FORCE VEHICLE MOVEMENT DEVICE AND SYSTEM

(71) Applicant: Toyota Motor Engineering & Manufacturing North America, Inc., Erlanger, KY (US)

(72) Inventors: Geoffrey David Gaither, Brighton, MI (US); Joshua D. Payne, Ann Arbor, MI (US); Nathan C. Westover, New Hudson, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 161 days.

(21) Appl. No.: 15/644,583

(22) Filed: Jul. 7, 2017

(65) Prior Publication Data

US 2019/0009679 A1  Jan. 10, 2019

(51) Int. Cl.
| | |
|---|---|
| *H02J 7/00* | (2006.01) |
| *B60L 11/18* | (2006.01) |
| *B60L 53/12* | (2019.01) |
| *B60L 53/66* | (2019.01) |

(52) U.S. Cl.
CPC ............. *B60L 11/182* (2013.01); *B60L 53/12* (2019.02); *B60L 53/665* (2019.02)

(58) Field of Classification Search
USPC ......................... 320/106, 107, 108, 109, 110
See application file for complete search history.

(56) References Cited

U.S. PATENT DOCUMENTS

| | | |
|---|---|---|
| 6,565,147 B1 | 5/2003 | Beals, Jr. |
| 8,111,164 B2 | 2/2012 | Bryce |
| 8,403,402 B1 | 3/2013 | Portela |
| (Continued) | | |

FOREIGN PATENT DOCUMENTS

| | | |
|---|---|---|
| CN | 101323285 | 12/2008 |
| CN | 102642528 | 8/2012 |
| (Continued) | | |

OTHER PUBLICATIONS

R. Alvaro et al.; "*Vehicle to vehicle energy exchange in smart grid applications*"; 2014 International Conference on Connected Vehicles and Expo (ICCVE), Nov. 2014; (6 pages).

(Continued)

*Primary Examiner* — Brian Ngo
(74) *Attorney, Agent, or Firm* — Snell & Wilmer LLP (57) ABSTRACT

Methods, systems, and device for charging and/or moving a vehicle. The charging and force movement system includes a high voltage battery for providing an electrical charge. The charging and force movement system includes an inductive loop configured to charge or move a second vehicle. The charging and force movement system includes an electronic control unit that is connected to at least one of the high voltage battery or the inductive loop. The electronic control unit is configured to determine whether the first vehicle is in a charging mode or in a force movement mode and control the high voltage battery and the inductive loop to receive from or provide a charge to the second vehicle when in the charging mode and repel or attract the second vehicle when in the force movement mode.

20 Claims, 6 Drawing Sheets

(56) References Cited

U.S. PATENT DOCUMENTS

| | | |
|---|---|---|
| 8,509,976 B2 | 8/2013 | Kempton |
| 8,860,362 B2 | 10/2014 | Kamen et al. |
| 9,393,878 B1 | 7/2016 | Failing |
| 2008/0077286 A1 | 3/2008 | Oyobe et al. |
| 2008/0114502 A1* | 5/2008 | Breed ............... B60C 11/24 701/2 |
| 2016/0052404 A1* | 2/2016 | Enomoto ............ B60L 11/182 320/108 |
| 2018/0086212 A1* | 3/2018 | Dudar ................ B60L 11/182 |
| 2018/0201148 A1* | 7/2018 | Donnelly ............ B60W 20/13 |
| 2019/0009679 A1* | 1/2019 | Gaither .............. B60L 11/182 |
| 2019/0135133 A1* | 5/2019 | Miller ................ B60L 53/12 |

FOREIGN PATENT DOCUMENTS

| | | |
|---|---|---|
| DE | 2913397 | 10/1980 |
| DE | 19520603 | 8/1996 |

OTHER PUBLICATIONS

S. Li et al.; *"Wireless Power Transfer for Electric Vehicle Applications"*; IEEE Journal of Emerging and Selected Topics in Power Electronics, vol. 3, No. 1, Mar. 2015; (14 pages).

L. Maglaras et al.; *"Cooperative approaches for dynamic wireless charging of Electric Vehicles in a smart city"*; Energycon 2014, May 2014; pp. 1365-1369; (5 pages).

M. Wang et al.; *"A Semi-distributed V2V Fast Charging Strategy Based on Price Control"*; Globecom 2014—Wireless Networking Symposium; pp. 4550-4555; (6 pages).

\* cited by examiner

ELECTROMAGNETIC CHARGE SHARING AND LOW FORCE VEHICLE MOVEMENT DEVICE AND SYSTEM

BACKGROUND

1. Field

This specification relates to a system and a method for providing electrical charging and/or an electrical force to move a vehicle.

2. Description of the Related Art

Vehicles that have high ratios of electrical to mechanical energy sources, such as electrical vehicles (EV) and plug-in hybrid vehicles (PHV), require plugging in to re-charge the on-board batteries. The number of electrical vehicles (EV) and plug-in hybrid vehicles (PHV) continues to grow while the infrastructure to support and provide energy for the growing number of electrical vehicles and plug-in hybrids lags behind. Moreover, the infrastructure to charge the electrical energy may be concentrated in high population areas such that it is difficult for EV and/or PHV vehicles to obtain electrical energy in rural and/or lightly populated areas where infrastructure to support electrical charging may be scarce. The scarcity of infrastructure is further worsened when multiple EV and/or PHV vehicles within a proximity of the limited infrastructure require energy at about the same time. The long charge duration required for charging an EV and/or a PHV vehicle forces other EV and/or PHV vehicles to wait while another EV and/or PHV vehicle is using the charging station. Thus, a mobile charging infrastructure that supports providing electrical energy to EV and/or PHV vehicles would greatly enhance the range of the EV and/or PHV vehicles.

Additionally, when plugging into an electrical energy source, the vehicle must be stationary for a long period of time. Thus, the vehicle is unable to continue traveling toward its destination. A mobile energy source that is mobile would allow the EV or PHV vehicle to continue travelling towards its destination without stopping. Moreover, while traveling, vehicles may encounter an accident or an emergency which requires preventive measures and/or assistance, such as towing or an emergency charge.

Accordingly, there is a need for a system and method for charging and/or moving a vehicle.

SUMMARY

In general, one aspect of the subject matter described in this specification is embodied in a charging and force movement system for a first vehicle. The charging and force movement system includes a high voltage battery for providing an electrical charge. The charging and force movement system includes an inductive loop configured to charge or move a second vehicle. The charging and force movement system includes an electronic control unit that is connected to at least one of the high voltage battery or the inductive loop. The electronic control unit is configured to determine whether the first vehicle is in a charging mode or in a force movement mode and control the high voltage battery and the inductive loop to receive from or provide a charge to the second vehicle when in the charging mode and repel or attract the second vehicle when in the force movement mode.

These and other embodiments may optionally include one or more of the following features. The inductive loop may be positioned within an outer portion of the first vehicle including at least one of a front portion, a back portion or a side portion of the first vehicle. The electronic control unit may be configured to detect that the second vehicle is within a threshold distance of the first vehicle. The electronic control unit may be configured to determine that the second vehicle is configured to receive the charge from the first vehicle. The electronic control unit may be further configured to receive a request from the second vehicle to provide the charge, and in response to the request, transmit a reply that requests payment information. The electronic control unit may be further configured receive the payment information and verify the payment information which includes determining whether a payer has sufficient funds.

The charging and force movement device may include a sensor. The sensor may be configured to detect the second vehicle when the second vehicle is within a threshold distance of the first vehicle. The electronic control unit may be configured to determine that the second vehicle is within the threshold distance of the first vehicle. The electronic control unit may be configured to set the inductive loop to repel or attract the second vehicle. The electronic control unit may be configured to determine that the second vehicle will impact the first vehicle and automatically set the first vehicle in the force movement mode in response to the determination that the second vehicle will impact the first vehicle. The electronic control unit may be configured to control a direction and a strength of the movement of the second vehicle when in the force movement mode. The electronic control unit may alter a strength of a polarity emitted by the inductive loop to control the strength of the movement of the second vehicle.

In another aspect, the subject matter is embodied in a method for charging or moving a surrounding vehicle. The method includes determining whether a vehicle is in a charging or movement mode. The method includes controlling a high voltage battery and an inductive loop of the vehicle to receive from or provide a charge or move the surrounding vehicle. Controlling the high voltage battery and the inductive loop includes emitting an electromagnetic energy to charge the surrounding vehicle or emitting the electromagnetic energy with a same or different polarity as a polarity of an inductive loop of the surrounding vehicle to move the surrounding vehicle.

In another aspect, the subject matter is embodied in a charging and force movement system for the first vehicle that includes a first inductive loop configured to receive a charge from a charging station. The charging and force movement system includes a second inductive loop configured to provide the charge to a second vehicle. The charging and force movement includes a high voltage battery for storing and providing the charge. The electronic control unit is configured to control the high voltage battery and the inductive loop to charge the second vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for wirelessly charging and/or moving a vehicle. Particular embodiments of the subject matter described in this specification may be implemented to realize one or more of the following advantages.

An inductive charging and/or low force movement system ("charging and force movement system") wirelessly charges and/or electromagnetically moves a vehicle. The charging and force movement system provides a vehicle an alternative energy source to charge the battery of the vehicle. The alternative energy source may be mobile, such as another vehicle or an autonomous robot, which allows the alternative energy source to travel to where the energy need exists, such as to the location of the vehicle. This allows the vehicle to remain mobile while charging and/or allow the energy source to travel to where the demand for energy exists. Moreover, the charging and force movement system may allow other vehicles to share the same energy source that is providing energy to the vehicle. This allows the energy source to provide energy to multiple vehicles simultaneously which reduces the need for additional infrastructure to support energy demand. For example, a first vehicle may receive a charge from a charging station and simultaneously charge a second vehicle.

Other benefits and advantages include generating a electromagnetic force to move a vehicle. The electromagnetic force may be used to tow or repel the vehicle. For example, a first vehicle may generate an electromagnetic force to pull a second vehicle from a ditch or pull the second vehicle along a roadway to reduce the driving load of the second vehicle. This increases fuel efficiency of the second vehicle and/or enhances the ability of the first vehicle to provide emergency services. In another example, the first vehicle may generate the electromagnetic force to repel an approaching vehicle which acts as an electrical bumper in a vehicle collision. This improves the safety of the vehicle in a collision. Additionally, the charging and force movement system may be switchable between the charging mode and the force movement mode. Thus, the charging and force movement system may utilize the same system and components to perform both the charging and/or force movement of one or more surrounding vehicles. The charging and force movement system may perform both the charging and/or the force movement of another simultaneously. For example, the charging and force movement system of a first vehicle may charge a second vehicle while simultaneously towing a third vehicle. This allows the vehicle to perform multiple functions concurrently.

Figure 1:
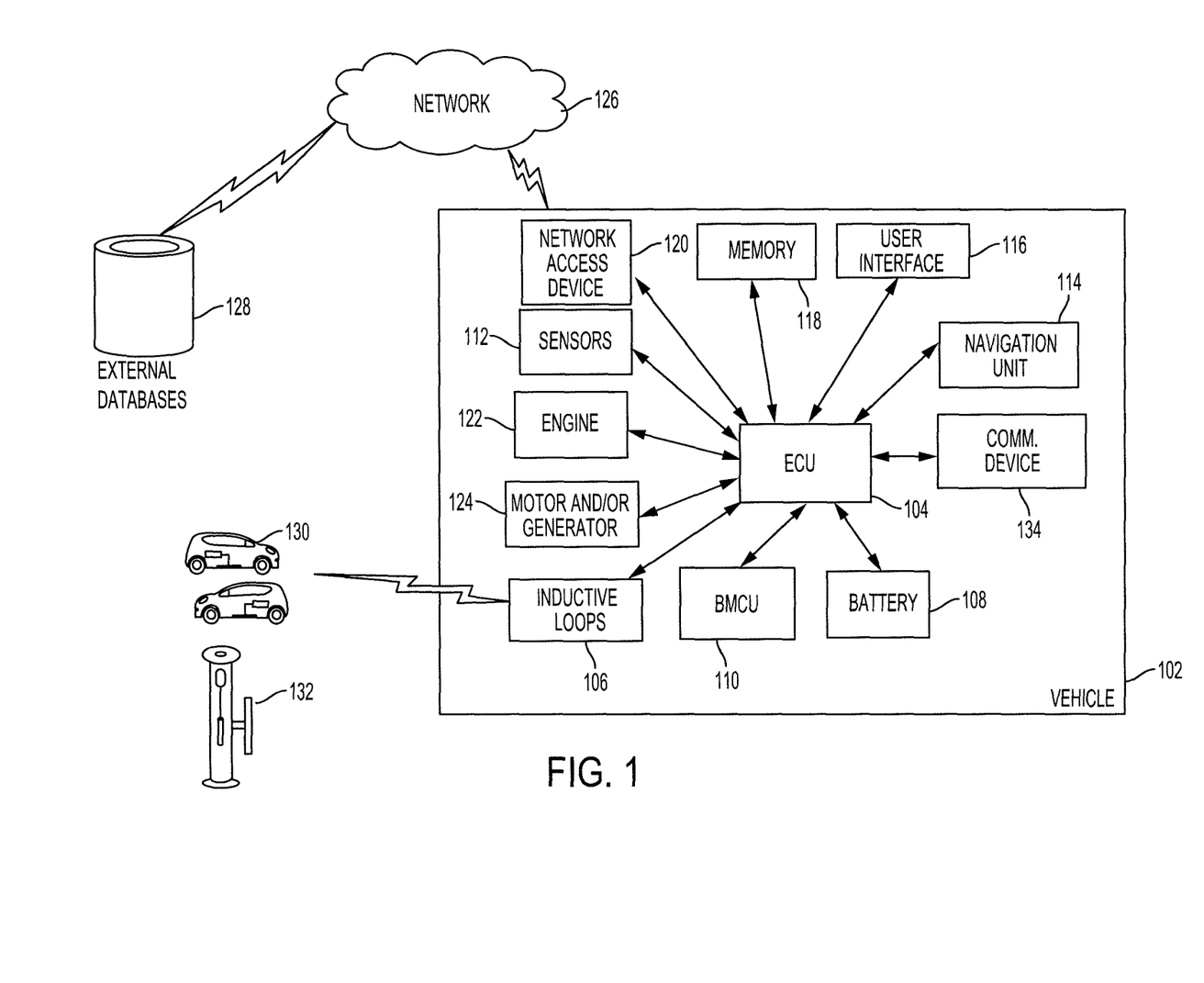
FIG. 1 is a block diagram of an example inductive charging and force movement system according to an aspect of the invention.

FIG. 1 is a block diagram of an example inductive charging and/or low force movement system ("charging and force movement system") 100. The charging and force movement system 100 includes one or more computers or electronic control units (ECUs) 104, appropriately programmed, to control the electrical charge provided to the one or more inductive loops 106 within the vehicle 102. The charging and force movement system 100 includes a battery 108, a battery management and control unit (BMCU) 110 and one or more inductive loops 106. The charging and force movement system 100 controls the battery 108 and the BMCU 110 to emit, provide or receive a charge, such as an electromagnetic force or field, by passing current through the one or more inductive loops 106 to wirelessly charge and/or electromagnetically move the vehicle 102 and/or one or more surrounding vehicles 130.

The charging and force movement system 100 may include one or more sensors 112, a navigation unit 114, a user interface 116, a communication device 134 and a memory 118. The charging and force movement system 100 may include a network access device 120, an engine 122 and/or a motor and/or generator 124.

The charging and force movement system 100 is included and/or retro-fitted in a vehicle 102. The charging and force movement system. 100 may be connected to a network 126 that may assist in communicating with one or more sensors 112, the external databases 128, the one or more surrounding vehicles 130 or other components of the charging and force movement system 100. A vehicle 102 is a conveyance capable of transporting a person, an object, or a permanently or temporarily affixed apparatus. A vehicle 102 may be a self-propelled wheeled conveyance, such as a car, sports utility vehicle, truck, bus, van or other motor or battery driven vehicle. For example, the vehicle 102 may be an electric vehicle (EV), a hybrid vehicle, a plug-in hybrid vehicle (PHV) or any other type of vehicle that includes a motor and/or generator 124. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may use one or more sensors 112 and/or the navigation unit 114 to drive autonomously.

The charging and force movement system 100 may be coupled to a network 126. The network 126, such as a local area network (LAN), a wide area network (WAN), a cellular network, a digital short-range communication (DSRC), the Internet, or a combination thereof, connects the charging and force movement system 100, one or more external databases

128, the one or more surrounding vehicles 130, charging infrastructure 132 and/or components of the charging and force movement system 100.

The charging and force movement system 100 in a vehicle 102 may wirelessly communicate with the one or more surrounding vehicles 130 through vehicle-to-vehicle (V2V) communication. The vehicle 102 may wirelessly communicate with the charging infrastructure 132 through vehicle-to-infrastructure (V2I) communication. The communication device 134 may be used to communicate between vehicles via V2V communication and/or between the vehicle 102 and the charging infrastructure 132 via V2I communication.

The charging and force movement system 100 may include a network access device 120. The network access device 120 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 120 may transmit data to and receive data from devices and systems not directly connected to the vehicle 102, such as the one or more external databases 128, the one or more surrounding vehicles 130 or the charging infrastructure 132.

The charging and force movement system 100 may be connected to one or more external databases 128. The external databases 128 may include databases from different service providers. A service provider may provide surrounding vehicle information and/or navigational map information.

A database is any collection of pieces of information that is organized for search and retrieval, such as by a computer, and the database may be organized in tables, schemas, queries, report, or any other data structures. A database may use any number of database management systems. An external database 128 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information may include a route that the vehicle 102 intends to travel. The route may include a starting location, a destination location and a path between the starting location and the destination location. The navigational map information may include terrain, political, traffic condition, roadway and/or charging infrastructure information along the route. The political information includes political features such as cities, states, zoning ordinances, and laws and regulations, and traffic signs. The roadway information includes road features such the grade of an incline of a road and/or the boundaries of one or more lanes that make up the roadway. The charging infrastructure information includes charging infrastructure features, such as charging stations. The traffic condition information includes one or more traffic condition features, such as a stop sign, traffic signal, traffic congested areas or accident areas. The traffic condition information may provide information related to the density and movement of vehicles on a roadway and/or accident locations. The traffic condition information may include real-time information of the traffic congested areas or accident areas. The real-time information may include the traffic in a particular lane. The terrain information may include terrain features, such as hills, flat terrains, or curves, and/or topographical information.

The features, e.g., charging infrastructure features, terrain features, road features, political features, or traffic condition features, which may be derived from the terrain, roadway, charging infrastructure, political or traffic condition information, each have a location that may be identified by map coordinates. The map coordinates may be defined by latitude and longitudinal coordinates or by a physical address.

The charging and force movement system 100 may include a motor and/or generator 124. The motor and/or generator 124 may be an electric motor and an electric generator that converts electrical energy into mechanical power, such as torque, and converts mechanical power into electrical energy. The motor and/or generator 124 may be coupled to the battery 108. The motor and/or generator 124 may convert the energy from the battery 108 into mechanical power, and may provide energy back to the battery 108, for example, via regenerative braking. The engine 122 combusts fuel to provide power instead of and/or in addition to the power supplied by the motor and/or generator 124.

The battery 108 may be coupled to the motor and/or generator 124 and may provide electrical energy to and receive electrical energy from the motor and/or generator 124. The battery 108 may include one or more rechargeable batteries and/or may be a high-powered battery. The battery 108 may be coupled to the one or more inductive loops 106 and may provide or receive a charge to or from a charging infrastructure 132 or a surrounding vehicle 130 via the one or more inductive loops 106. The battery 108 may provide a charge to the one or more inductive loops 106 to wirelessly charge one or more surrounding vehicles 130 and/or to move the one or more surrounding vehicles 130. The battery 108 may receive a charge from one or more surrounding vehicles 130 and/or a charging infrastructure 132 to store the charge.

The BMCU 110 may be coupled to the battery 108 and control and manage the charging and discharging of the battery 108. The BMCU 110, for example, may measure, using battery sensors (not shown), parameters used to determine the state of charge (SOC) of the battery 108.

The charging infrastructure 132 may be a vertical charging station that is above-ground. By being above-ground, the chance of interference, resulting from, for example, precipitation and sediments, between the inductive loops of the charging station and the inductive loops 106 of the vehicle 102 is reduced. In some implementations, an autonomous robot may charge the vehicle 102 via the one or more inductive loops 106.

The one or more ECUs 104 may be implemented as a single ECU or in multiple ECUs. The ECU 104 may be coupled to at least one of the navigation unit 114, the one or more sensors 112, the network access device 120, the one or more inductive loops 106, the battery 108, the BMCU 110 and/or the memory 118. The ECU 104 may include one or more processors or controllers specifically designed for controlling the BMCU 110 to manage the battery 108 to deliver and/or store a charge to the one or more inductive loops 106 to wirelessly charge and/or move one or more surrounding vehicles 130.

The charging and force movement system 100 may include one or more inductive loops 106. The ECU 104 may use the BMCU 110 and the battery 108 to control an electrical charge through the one or more inductive loops 106 to provide the electrical charge to one or more surrounding vehicles 130. The ECU 104 may control the electrical charge through the one or more inductive loops 106 to move one or more surrounding vehicles 130, such as to repel or push a surrounding vehicle 130 or pull or attract the surround vehicle 130. In some implementations, the charging and force movement system 100 may have multiple inductive loops 106, and each may be configured differently. For example, one inductive loop may receive a charge to store in the battery 108, a second inductive loop may provide a charge to a surrounding vehicle 130, while a third inductive loop may move, such as repel or attract, a different surrounding vehicle. Each inductive loop of the one or more inductive loops 106 may be configurable to switch between providing a charge, receiving a charge, repelling a surrounding vehicle 130 and/or attracting the surrounding vehicle 130. Each inductive loop may be configured independently of the other inductive loops of the one or more inductive loops 106.

The one or more inductive loops 106 may be positioned in different portions of the vehicle 102, such as the front portion 502 of the vehicle 102 to connect and receive charge from the charging infrastructure 132, the rear portion 504 and/or a side portion, such as the doors, as shown in FIGS. 5A-5E. The one or more inductive loops 106 may be integrated in a side portion, such as one or more doors including a front passenger-side door 506, a back passenger-side door 508, a front driver-side door 510 and a back driver-side door 512. The one or more inductive loops 106 may connect to the charging infrastructure 132.

The memory 118 may be coupled to the ECU 104. The memory 118 may store instructions to execute on the ECU 104 and may include one or more of a RAM or other volatile or non-volatile memory. The memory 118 may be a non-transitory memory or a data storage device, such as a hard disk drive, a solid-state disk drive, a hybrid disk drive, or other appropriate data storage, and may further store machine-readable instructions, which may be loaded and executed by the ECU 104.

The one or more sensors 112 may be coupled to the ECU 104 and include one or more proximity sensors. The one or more proximity sensors may be positioned on the front, side and/or rear of the vehicle 102 to detect surrounding vehicles and/or objects that are within a threshold distance of the vehicle 102 in the front, the side and/or the back of the vehicle 102, respectively. The proximity sensor may use radar, a camera, vehicle-to-vehicle (V2V) communication or other means to detect and/or measure a distance to the other vehicles or objects.

The navigation unit 114 may be coupled to the ECU 104 and provide vehicle information and/or navigational map information to the ECU 104. The navigation unit 114 may have or be connected to a Global Positioning System (GPS) device. The vehicle information may include the current position, location, direction and/or speed of the vehicle 102.

The user interface 116 may provide an interface for input and/or output. The user interface 116 may have user elements. The input may include user input to configure the different modes and/or settings. The output may include notifications and/or alerts indicating the initialization or use of the charging and force movement system 100.

Figure 2:
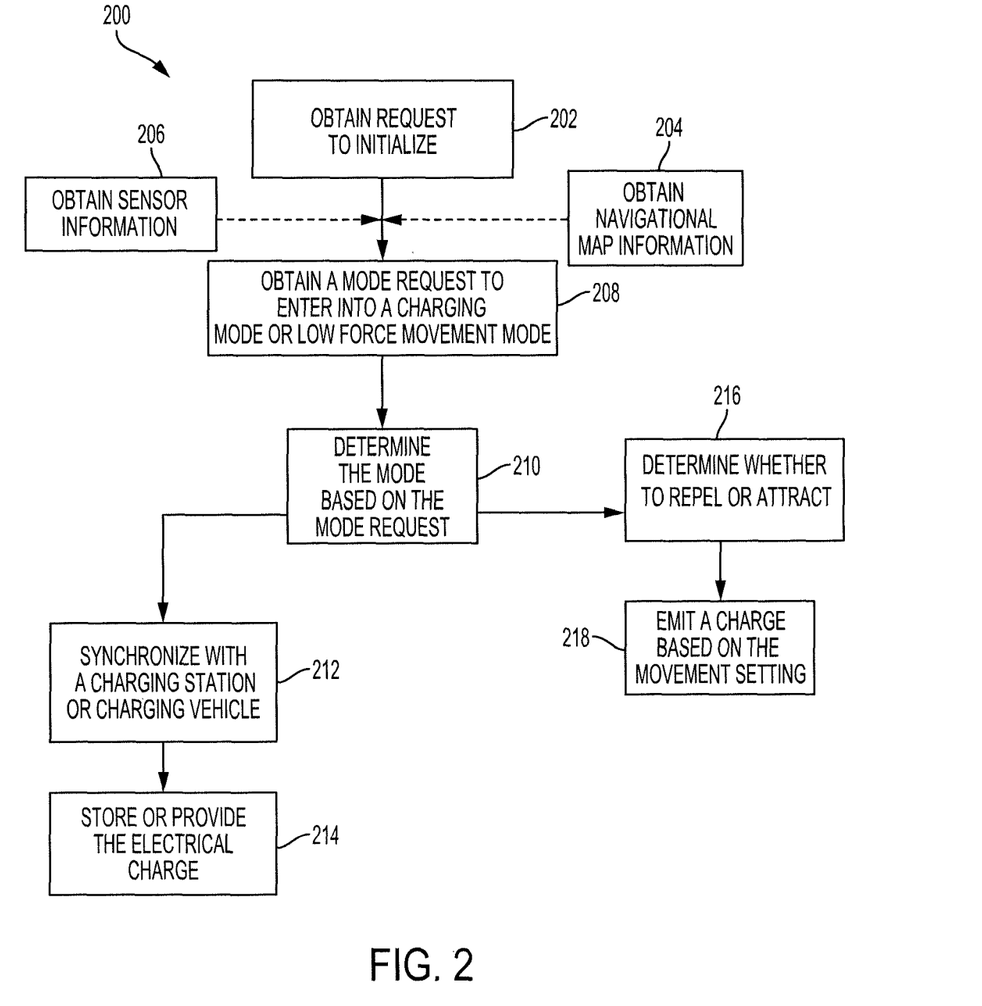
FIG. 2 is a flow diagram of an example process for charging and/or moving a vehicle and/or one or more surrounding vehicles according to an aspect of the invention.

FIG. 2 is a flow diagram of an example process for charging and/or moving a vehicle 102 and/or one or more surrounding vehicles 130. One or more computers or one or more data processing apparatuses, for example, the one or more ECUs 104 of the charging and force movement system 100 of FIG. 1, appropriately programmed, may implement the process 200.

The charging and force movement system 100 may obtain a request to initialize (202). The charging and force movement system 100 may receive the request when the vehicle 102 becomes operational or when an occupant of the vehicle 102 activates the charging and force movement system 100, e.g., through a user interface 116. The charging and force movement system 100 may receive the request from one or more sensors 112, such as an engine sensor, when the vehicle 102 is powered on. The charging and force movement system 100 may receive the request upon user activation, for example, when a token, such as a key, is inserted to start the vehicle 102. When the charging and force movement system 100 is initialized, the charging and force movement system 100 may display an indicator on the user interface 116 to indicate to the driver that the charging and force movement system 100 is initialized.

The charging and force movement system 100 may obtain navigational map information (204). The charging and force movement system 100 may obtain the navigational map information using the navigation unit 114. The charging and force movement system 100 may obtain sensor information (206). The charging and force movement system 100 may use one or more sensors 112 to obtain the sensor information.

The sensor or navigational map information may include one or more locations of one or more surrounding vehicles 130. The one or more surrounding vehicle 130 may be equipped with the charging and force movement system 100 so as to provide the inductive and/or wireless charging capabilities and the low force movement capabilities. The navigational map information may include information that provides the location of vehicles having the charging and force movement system or the location of charging infrastructures. The navigation unit 114 may generate a route from a current location or initial location of the vehicle 102 to a destination having the most charging infrastructure 132 and/or equipped vehicles to provide the most charging options. The charging and force movement system 100 may calculate a distance from the vehicle 102 to the one or more surrounding vehicles 130 to be included in the obtained navigational map or sensor information, or use a sensor, such as a proximity sensor, to detect the distance to be included in the obtained sensor information.

The sensor information may include battery information including a state-of-charge (SOC) of the battery 108. The charge and force movement system 100 may use the BMCU 110 or one or more sensors 112, such as a battery sensor, to obtain the state-of-charge of the battery. The battery information may include a rate that the SOC of the battery 108 is increasing or decreasing.

The charging and force movement system 100 obtains a mode request, such as a charging mode or low force movement mode, to enter into (208). The charging mode may have a charge setting that indicates that the charging and force movement system 100 be configured to receive a charge and/or provide a charge. The low force movement mode may have a movement setting that indicates that the charging and force movement system 100 be configured to repel or attract a surrounding vehicle 130. The charging and force movement system 100 may receive the mode request including the one or more settings from user input into the user interface 116. For example, the charging and force movement system 100 may be entered into the low force movement mode and set to attract to tow a surrounding vehicle 130.

In some implementations, the charging and force movement system 100 may obtain the mode request based on sensor information. For example, the charging and force movement system 100 may automatically generate a mode request for the charging mode that includes the setting to receive the electrical charge when the state-of-charge is below a threshold amount. The threshold amount may be a calculated amount where the vehicle 102 is able to reach the destination using the remaining electrical energy or a remaining total energy that includes both the remaining fuel and non-fuel energy. Thus, when the vehicle 102 is unable to reach the destination based on at least one of the remaining total energy or the remaining electrical energy, the charging and force movement system 100 may be configured to receive electrical energy.

In another example, the charging and force movement system 100 may automatically generate a mode request for the low force movement mode that includes the setting to repel or push the surrounding vehicle 130. The charging and force movement system 100 may determine that the surrounding vehicle 130 is about to impact the vehicle 102, such as when the distance that may be included or calculated from the sensor information is less than a threshold amount. Thus, when the surrounding vehicle 130 is about to impact the vehicle 102, the charging and force movement system 100 may be configured to repel the surrounding vehicle 130.

The charging and force movement system 100 determines the mode based on the mode request (210). If the charging and force movement system 100 is in the charging mode, the charging and force movement system 100 synchronizes with the charging infrastructure 132, such as a charging station, or the one or more surrounding vehicles 130 (212).

The charging and force movement system 100 synchronizes with a charging infrastructure or one or more surrounding vehicles 130 when in the charging mode. The charging and force movement system 100 may use one or more sensors 112 to detect the charging infrastructure 132 or the one or more surrounding vehicles 130. The charging and force movement system 100 may use navigational map information from the navigation unit 114 and/or sensor information from the one or more sensors 112 to determine the location of the vehicle 102, the location of the charging infrastructure 132 and/or the location of one or more surrounding vehicles 130 to determine that the vehicle 102 is within range of the charging station 132 or the surround vehicle 130 to receive or provide a charge. For example, the charging and force movement system 100 may compare the current location of the vehicle 102 that may be obtained from the navigational map information with the location of the charging infrastructure 132 and/or the location of the one or more surrounding vehicle 130.

Figure 3:
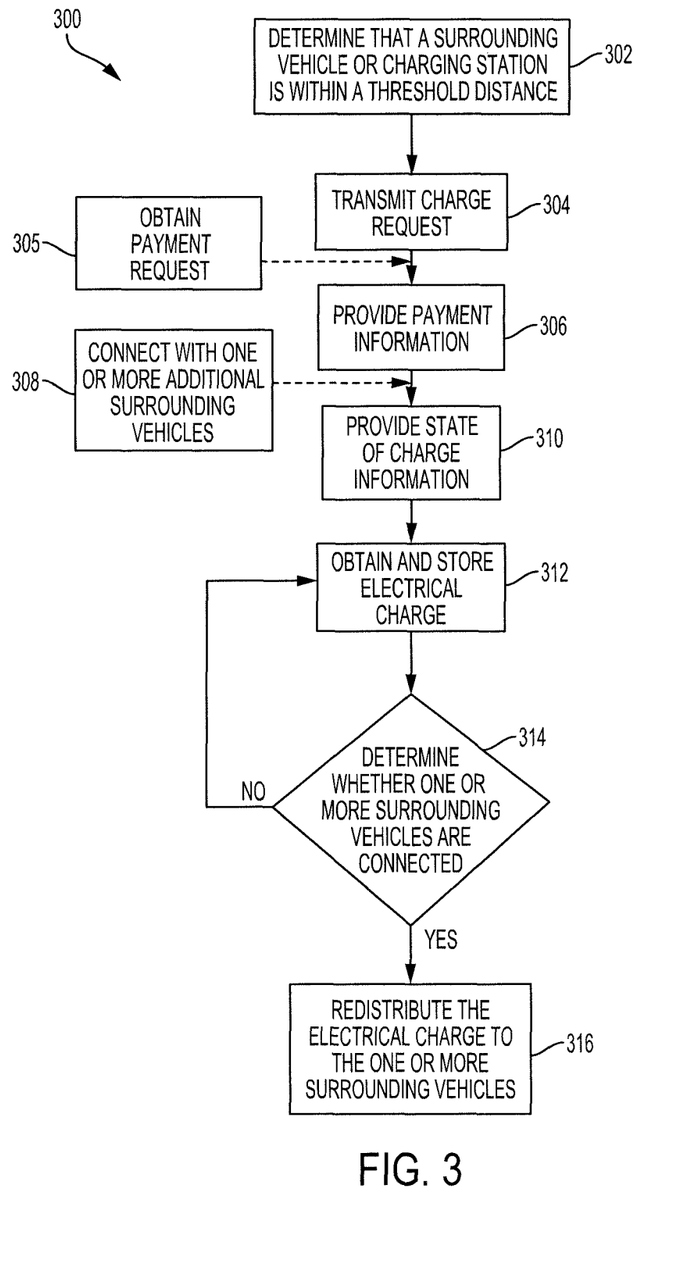
FIG. 3 is a flow diagram of an example process for synchronizing the vehicle with the charging station and/or one or more surrounding vehicles to charge the vehicle according to an aspect of the invention.

If the location of the charging infrastructure 132 and/or the location of the one or more surrounding vehicles 130 is within a threshold distance of the current location of the vehicle 102, the charging and force movement system 100 synchronizes with the charging infrastructure 132 and/or the surrounding vehicle 130 to receive or provide the charge. FIG. 3 further describes the synchronization of the vehicle 102 to the charging infrastructure 132 and/or the one or more surrounding vehicles 130.

Once the charging and force movement system 100 is synchronized, the charging and force movement system 100 either stores the electrical charge in the battery 108 of the vehicle 102 or provides the electrical charge to the one or more surrounding vehicles 130 (214). The charging and force movement system 100 may determine whether to store the electrical charge in the battery 108 or provide the electrical charge to the one or more surrounding vehicles based on the charge setting included in the mode request.

If the charge setting indicates that the vehicle 102 is to receive the electrical charge, the charging and force movement system 100 may configure the inductive loops 106 to receive the electrical charge and have the BMCU 110 store the electrical charge into the battery 108. The electrical charge may be received by one of the one or more inductive loops 106 that may be determined by the location of the charging infrastructure 132 or the location of the surrounding vehicle 130 providing the electrical charge.

If the charge setting indicates that the vehicle 102 is to provide the electrical charge to one or more surrounding vehicles 130, the charging and force movement system 100 may configure the BMCU 110 to distribute electrical energy from the battery 108 to one or more inductive loops 106 based on the location of the surrounding vehicle 130. The charging and force movement system 100 may emit or transmit the electrical charge using an inductive loop positioned closest to the surrounding vehicle 130. The location of the surrounding vehicle 130 may be determined from the navigational map information and/or the sensor information.

For example, the charging and force movement system 100 may determine that the charging infrastructure 132 is in front of the vehicle 102 so uses an inductive loop 106 that is positioned in the front of the vehicle 102 to receive the electrical charge. In another example, the charging and force movement system 100 may determine that one or more surrounding vehicles 130 is behind the vehicle 102 and uses an inductive loop 106 that is positioned in the rear of the vehicle 102 to provide the electrical charge.

If the charging and force movement system 100 is in the low force movement mode, the charging and force movement system 100 determines whether to repel or attract the one or more surrounding vehicles 130 based on the movement setting included in the mode request (216). The charging and force movement system 100 may control the BMCU 110 to have the battery 108 emit an electrical charge having a same polarity as the electrical charge emitted by the charging and force movement system 100 of the surrounding vehicle 130 to repel or push the surrounding vehicle 130 or a different polarity as the electrical charge emitted by the charging and force movement system 100 of the surrounding vehicle 130 to attract or pull the surrounding vehicle 130 based on the movement setting (218). The charging and force movement system 100 may emit the electrical charge using one of the one or more inductive loops 106.

The charging and force movement system 100 of a first vehicle may work in conjunction with the charging and force movement system 100 of the second vehicle to either repel or attract each other. For example, the inductive loop of the first vehicle may have a charge of an opposite polarity of the charge of the inductive loop of the second vehicle to attract one another so that the first vehicle may tow the second vehicle. The inductive loop of the first vehicle may have a charge of the same polarity of the charge of the inductive loop of the second vehicle so that the two vehicles repel each other to form the electromagnetic bumper that is a generated repulsion force that dissipates some of the kinetic energy involved in a collision. In another example, the second vehicle that is trailing the first vehicle may push or repel the first vehicle. In some implementations, the only the first vehicle has the charging and force movement system 100 and instead the charge repels or attracts the metallic body of the second vehicle.

The charging and force movement system 100 may control the strength of the repulsion, attraction or the charging by controlling the strength of the electrical charge that is emitted. The strength may be based on user input from the user interface 116.

The position of the one of the one or more inductive loops 106 that are used may be based on a location of the one or more surrounding vehicles 130 obtained from the sensor information and/or navigational map information or obtained from user input. For example, if the charging and force movement system 100 detects that the surrounding vehicle 130 is about to impact the vehicle 102, the charging and force movement system 100 may emit the electrical charge to repel the surrounding vehicle 130 through an inductive loop 106 positioned nearest the point of impact, such as in the rear of the vehicle 102 when the surrounding vehicle 130 is about to impact the vehicle 102 from behind. In another example, a user may select the setting for the charging and force movement system 100 to attract or pull the surrounding vehicle 130 and may designate the charging and force movement system 100 to use the rear inductive loop to attract, tow or pull the surrounding vehicle 130 that is behind the vehicle 102. The polarity, when configured to repel or attract, may be communicated with and agreed upon by the surrounding vehicle 130, sensed by one or both of the vehicles and/or may be standardized.

FIG. 3 is a flow diagram of an example process for synchronizing the vehicle 102 with the charging infrastructure 132 and/or one or more surrounding vehicles 130 to charge the vehicle 102 when set to receive an electrical charge. One or more computers or one or more data processing apparatuses, for example, the one or more ECUs 104 of the charging and force movement system 100 of FIG. 1, appropriately programmed, may implement the process 300.

The charging and force movement system 100 may determine that a charging infrastructure 132 and/or a surrounding vehicle 130 is within a threshold distance of the vehicle 102 (302). If the charging and force movement system 100 is in the charging mode and the setting is set to receive the electrical charge, the charging and force movement system 100 may transmit a charge request that indicates that the vehicle 102 is in need of an electrical charge (304). The charge request may be a wake-up sensing signal that is sent from vehicles wanting a charge and may be induced by having a current sent through the inductive loop 106 or through the communication device 134. In some implementations, the charging and force movement system 100 may regularly or continuously broadcast or multicast a charge request and awaits a response. Otherwise, the charging and force movement system 100 continues to monitor for a charging infrastructure 132 and/or a surrounding vehicle 130.

The charging and force movement system 100 may receive a payment request from the charging infrastructure 132 and/or the surrounding vehicle 130 in response to the charge request (305). The payment request may include a request for payment information including a user's credit card information and/or billing information. The payment request may include a service description, such as a cost per amount of charge. The charging and force movement system 100 may transmit the payment information to the charging infrastructure 132 or the surrounding vehicle 130 that is providing the electrical charge to authorize the transaction (306).

The charging and force movement system 100 may connect with one or more other surrounding vehicle 130 to redistribute the received charge to the one or more other surrounding vehicles 130 (308). The charging and force movement system 100 may similarly transmit and/or receive a charging request and/or a payment request to facilitate redistribution of the electrical energy to the other surrounding vehicles 308. For example, this allows the vehicle 102 to receive an electrical charge from a charging infrastructure 132 and distribute the electrical charge to other surrounding vehicles 130 so that all the vehicles may be simultaneously charged using a single charging infrastructure 132. The vehicle 102 may redistribute the electrical charge in exchange for payment.

The charging and force movement system 100 may provide the state-of-charge of the battery 108 of the vehicle 102 to the charging infrastructure 132 and/or the one or more surrounding vehicles 130 that are providing a charge to the vehicle 102 (310). The charging and force movement system 100 may provide the state-of-charge so that the charging infrastructure 132 and/or the one or more surrounding vehicles 130 providing the charge discontinues the flow of the electric charge when the battery 108 is full or otherwise directed by the vehicle 102, such as by a user input.

The charging and force movement system 100 obtains the electrical charge from the one or more surrounding vehicles 130 or the charging infrastructure 132 via one or more of the inductive loops 106. The charging and force movement system 100 may use the BMCU 110 to store the electrical charge in the battery 108 (312). The charging and force movement system 100 may store the electrical charge until the state-of-charge reaches a threshold limit, such as a full battery or enough to reach the destination based on the route included in the navigational map information.

The charging and force movement system 100 may determine whether one or more surrounding vehicles 130 are connected to obtain electrical energy from the vehicle 102 (314). If no surrounding vehicle 130 is connected to obtain electrical energy from the vehicle 102, then the charging and force movement system 100 continues to obtain and store the electrical energy in the battery 108 until the battery reaches the threshold limit. If there is a surrounding vehicle that is connected to the vehicle 102 to obtain the electrical charge, the charging and force movement system 100 may redistribute a portion of the electrical charge to the one or more surrounding vehicles 130 that have been authorized to receive the electrical charge via the one or more inductive loops 106 (316).

Figure 6A:
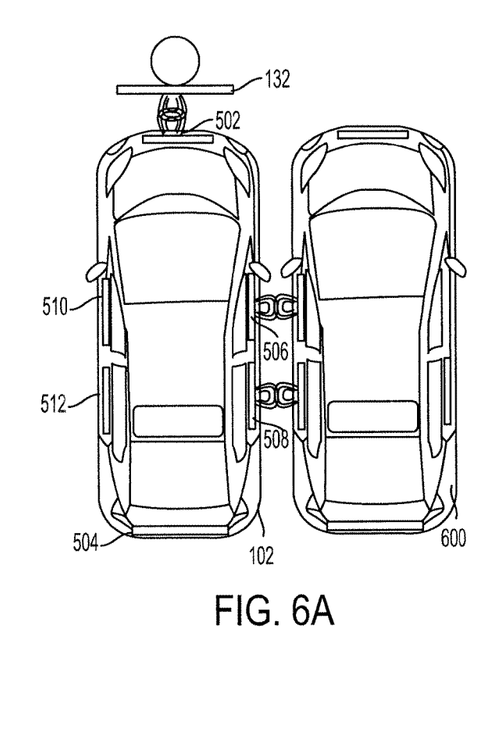
FIGS. 6A-6C are example graphical illustrations of the various positions the vehicle may connect to the charging station and/or one or more surrounding vehicles according to an aspect of the invention.

For example, the vehicle 102 may be wirelessly connected to the charging infrastructure 132, as shown in FIG. 6A. The charging infrastructure 132 may be charging the vehicle 102 through the inductive loop 106 positioned in the front portion 502 of the vehicle 102. An adjacent surrounding vehicle 130 may be positioned near and within a threshold distance of the passenger side doors 506, 508 of the vehicle 102. The vehicle 102 may charge the second vehicle 600 that is adjacent to the vehicle 102.

Figure 6B:
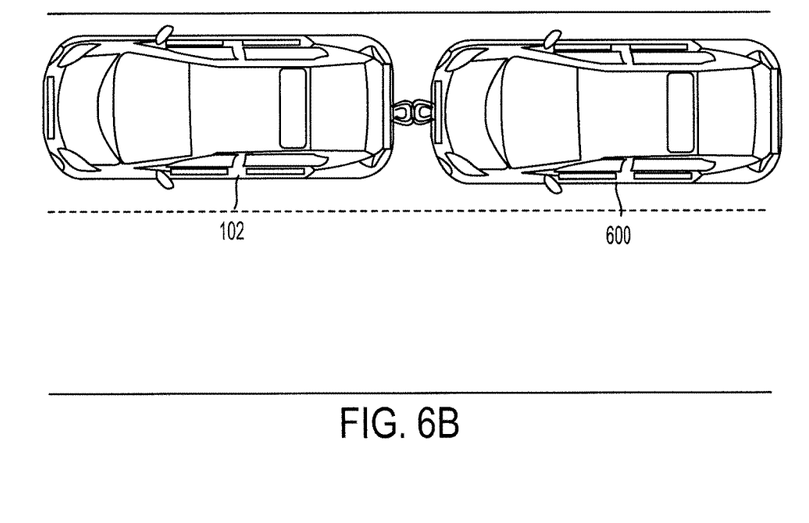

In another example, the vehicle 102 may charge the second vehicle 600 behind the vehicle 102, as shown in FIG. 6B. The vehicle 102 may charge the second vehicle 600 via the rear portion 504 of the vehicle 102 being connected to the front portion 604 of the second vehicle 600.

Figure 6C:
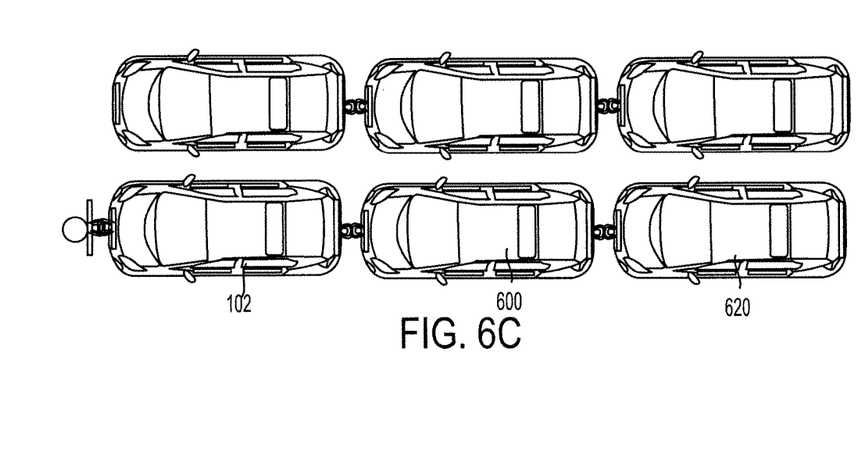

In another example, the vehicle 102 is chained to multiple vehicles, as shown in FIG. 6C. The vehicle 102 is connected to the second vehicle 600. The vehicle 102 charges the second vehicle 600. The second vehicle 600 is connected to and charges a third vehicle 620. The multiple vehicles may be driving, such as in a caravan or platoon of vehicles, on a roadway or be stationary near an electric charging infrastructure 132 that is charging the vehicle 102 and redistributes the charge to the other vehicles.

Figure 4:
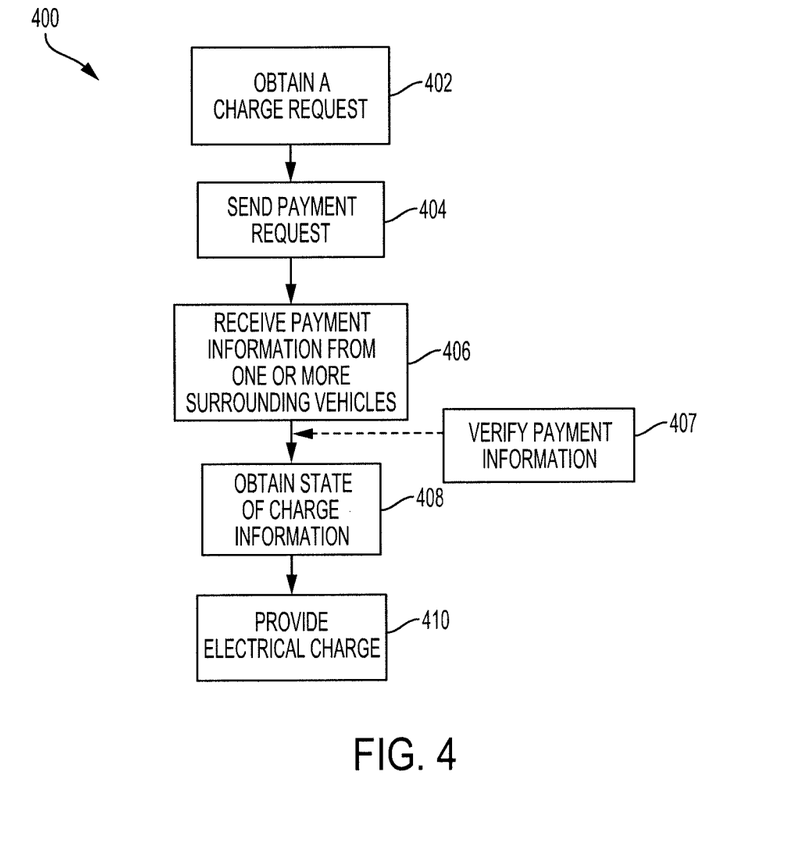
FIG. 4 is a flow diagram of an example process for synchronizing the vehicle with the one or more surrounding vehicles to charge the one or more surrounding vehicles according to an aspect of the invention.
Figure 5A:
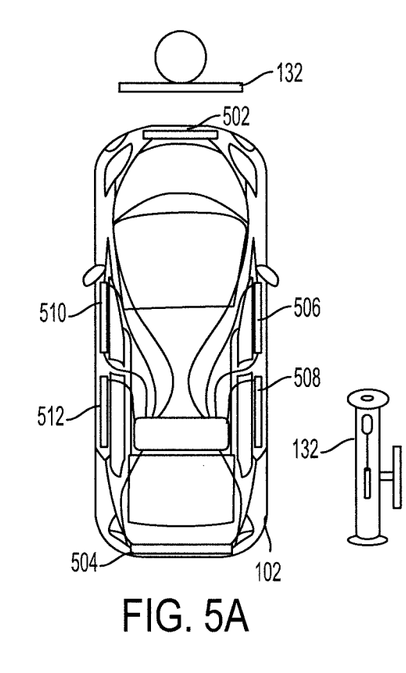
FIG. 5A is an example top perspective view of a vehicle having the charging and movement system of FIG. 1 according to an aspect of the invention.
Figure 5B:
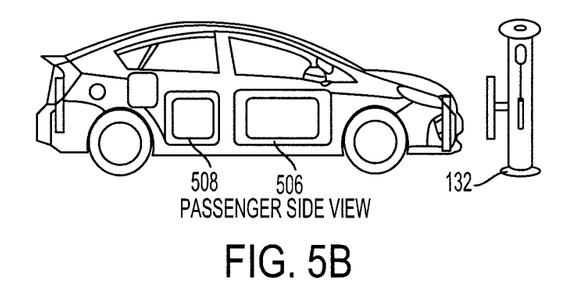
FIG. 5B is an example passenger side perspective view of the vehicle having the charging and movement system of FIG. 1 according to an aspect of the invention.
Figure 5C:
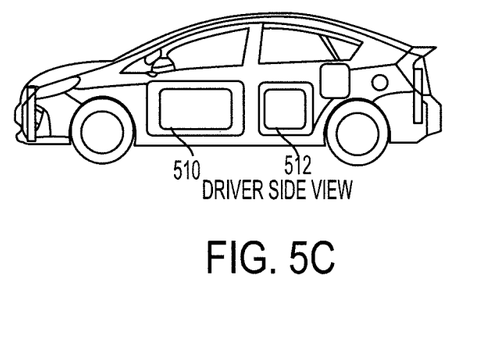
FIG. 5C is an example driver side perspective view of the vehicle having the charging and movement system of FIG. 1 according to an aspect of the invention.
Figure 5D:
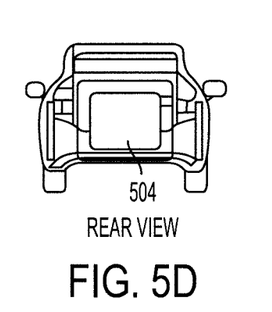
FIG. 5D is an example rear perspective view of the vehicle having the charging and movement system of FIG. 1 according to an aspect of the invention.
Figure 5E:
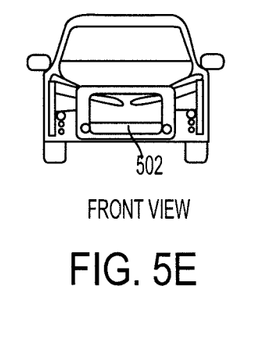
FIG. 5E is an example front perspective view of the vehicle having the charging and movement system of FIG. 1 according to an aspect of the invention.

FIG. 4 is a flow diagram of an example process for synchronizing the vehicle 102 with the one or more surrounding vehicles 130 to charge the one or more surrounding vehicles 130 when set to provide an electrical charge. One or more computers or one or more data processing apparatuses, for example, the one or more ECUs 104 of the charging and force movement system 100 of FIG. 1, appropriately programmed, may implement the process 400.

The charging and force movement system 100 may obtain a charging request from one or more surrounding vehicles 130 (402). When the charging and force movement system 100 is in the charging mode and set to provide electrical energy to one or more surrounding vehicles 130, the charging and force movement system 100 may initiate or send a payment request in response to the charge request obtained (404). The payment request may include a request for payment information and a cost or price for the sale of the electrical energy. The charging and force movement system 100 may receive payment information from one or more surrounding vehicles 130 that request to receive an electrical charge (406). The payment information may include billing information, such as a credit or debit card information and a billing address.

In response to receiving the payment information, the charging and force movement system 100 may verify and/or validate the payment information with a third-party vendor, such as a credit card issuer or credit card network (407). The verification and/or validation may include a determination that the payer has sufficient funds. Upon validation, the charging and force movement system 100 may obtain the state-of-charge of the battery of the surrounding vehicle 130 that is charging (408). The charging and force movement system may provide the electrical charge to the surrounding vehicle 130 that is requesting the charge until the state-of-charge of the surrounding vehicle 130 is at or above a threshold limit, such as a full battery (410). The charging and force movement system 100 may limit the amount of energy provided to the surrounding vehicle 130 that is charging based on its own state-of-charge if the vehicle 102 is not connected to a charging infrastructure 132 so as not to deplete its own battery 108 beyond a threshold limit.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A charging and force movement system for a first vehicle, comprising:
    a high voltage battery for providing an electrical charge;
    an inductive loop configured to charge or move a second vehicle; and
    an electronic control unit connected to at least one of the high voltage battery or the inductive loop and configured to:
        determine whether the first vehicle is in a charging mode or in a force movement mode; and
        control the high voltage battery and the inductive loop to receive from or provide a charge to the second vehicle when in the charging mode and repel or attract the second vehicle when in the force movement mode.

2. The charging and force movement system of claim 1, wherein the inductive loop is positioned within an outer portion of the first vehicle including at least one of a front portion, a back portion or a side portion of the first vehicle.

3. The charging and force movement device of claim 1, wherein the electronic control unit is configured to:
    detect that the second vehicle is within a threshold distance of the first vehicle; and
    determine that the second vehicle is configured to receive the charge from the first vehicle.

4. The charging and force movement device of claim 3, wherein to determine that the second vehicle is configured to receive the charge from the first vehicle the electronic control unit is further configured to:
    receive a request from the second vehicle to provide the charge; and
    in response to the request, transmit a reply that requests payment information.

5. The charging and force movement device of claim 4, wherein the electronic control unit is further configured to:
    receive the payment information; and
    verify the payment information including determining whether a payer has sufficient funds.

6. The charging and force movement device of claim 1, further comprising:
    a sensor configured to detect the second vehicle when the second vehicle is within a threshold distance of the first vehicle;
    wherein the electronic control unit is configured to:
    determine that the second vehicle is within the threshold distance of the first vehicle; and
    set the inductive loop to repel or attract the second vehicle.

7. The charging and force movement device of claim 6, wherein the electronic control unit is configured to:
    determine that the second vehicle will impact the first vehicle; and
    automatically set the first vehicle in the force movement mode in response to the determination that the second vehicle will impact the first vehicle.

8. The charging and force movement device of claim 1, wherein to control the high voltage battery and the inductive loop to provide the charge to the second vehicle when in the charging mode and move the second vehicle when in the force movement mode, the electronic control unit is further configured to:
    control a strength of the charge to provide to the second vehicle when in the charging mode and control a direction and a strength of the movement of the second vehicle when in the force movement mode.

9. The charging and force movement device of claim 8, wherein to control the strength of the charge or the strength of the movement the electronic control unit is further configured to:
    alter a strength of a polarity emitted by the inductive loop.

10. The charging and force movement system of claim 1, wherein the electronic control unit is configured to:
    obtain a mode request that sets the first vehicle into the charging mode to receive or provide the charge when a state-of-charge of the first vehicle is below a threshold amount; and
    determine that the first vehicle is in the charging mode based on the mode request.

11. The charging and force movement system of claim 10, wherein the threshold amount is an amount of fuel and non-fuel energy that is required for the first vehicle to reach a destination.

12. The charging and force movement system of claim 10, further comprising:
    a sensor configured to obtain sensor information including a location of the second vehicle or a location of a charging infrastructure; and a navigation unit configured to generate a route from a location of the first vehicle to the location of the second vehicle or the location of the charging infrastructure.

13. The charging and force movement system of claim 1, wherein the electronic control unit is configured to:
    obtain a mode request that sets the first vehicle into the force movement mode when a distance between the first vehicle and the second vehicle is less than a threshold amount that indicates that the second vehicle is about to impact the first vehicle, wherein the mode request includes a movement setting that indicates whether to repel or attract another vehicle; and
    determine that the first vehicle is in the force movement mode based on the mode request.

14. The charging and force movement system of claim 13, wherein the electronic control unit is configured to determine whether to repel or attract the second vehicle based on the movement setting.

15. A charging and force movement system for a first vehicle, comprising:
    a high voltage battery for providing an electrical charge;
    an inductive loop configured to receive a charge, provide the charge or move a second vehicle; and
    an electronic control unit connected to at least one of the high voltage battery or the inductive loop and configured to:
    obtain a mode request that sets the first vehicle into a charging mode or into a force movement mode;
    determine whether the first vehicle is in the charging mode or in the force movement mode based on the mode request; and
    control the high voltage battery and the inductive loop to receive from or provide the charge to the second vehicle when in the charging mode and repel or attract the second vehicle when in the force movement mode.

16. The charging and force movement system of claim 15, wherein the electronic control unit is configured to:
    determine that the first vehicle is in the charging mode based on the mode request; and
    control the high voltage battery and the inductive loop to receive from or provide the charge to the second vehicle.

17. The charging and force movement system of claim 15, wherein the electronic control unit is configured to:
    determine that the first vehicle is in the force movement mode based on the mode request; and
    control the high voltage battery and the inductive loop to repel or attract the second vehicle based on a movement setting.

18. A charging and force movement system for a first vehicle, comprising:
    a high voltage battery for providing an electrical charge;
    a navigation unit configured to:
    obtain navigational map information including a location of a second vehicle or a location of the charging infrastructure, and
    generate a route from a location of the first vehicle to the location of the second vehicle or the location of the charging infrastructure;
    an inductive loop configured to receive a charge from, provide the charge to or move the second vehicle; and
    an electronic control unit coupled to the high voltage battery, the inductive loop and the navigation unit and configured to:
    determine whether the first vehicle is in a charging mode or in a force movement mode; and
    control the high voltage battery and the inductive loop to receive from or provide the charge to the second vehicle when in the charging mode and repel or attract the second vehicle when in the force movement mode.

19. The charging and force movement system of claim 18, wherein the electronic control unit is configured to:
    obtain a mode request that sets the first vehicle into the charging mode to receive or provide the charge when a state-of-charge of the first vehicle is below a threshold amount; and
    determine that the first vehicle is in the charging mode based on the mode request.

20. The charging and force movement system of claim 18, wherein to control the high voltage battery and the inductive loop to receive from or provide the charge to the second vehicle when in the charging mode and repel or attract the second vehicle when in the force movement mode the electronic control unit is configured to:
    control a strength of the charge to receive from or provide to the second vehicle when in the charging mode; and
    control a direction and a strength of the movement of the second vehicle when in the force movement mode.

* * * * *